Harford J. Perkins. Williamsport, Penna.
105244  Improvement in Machines for Sharpening the Teeth of Saws.  PATENTED JUL 12 1870
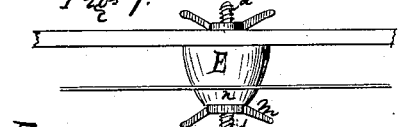
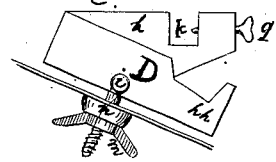
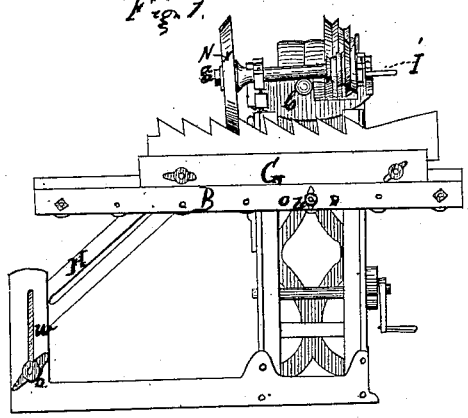
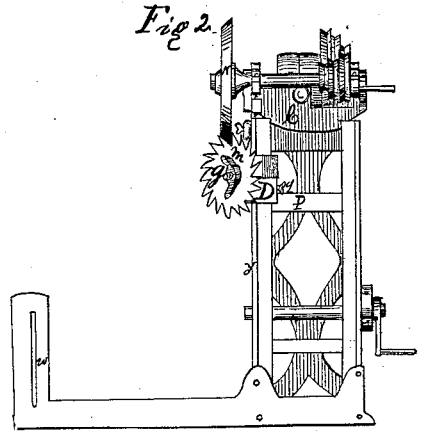
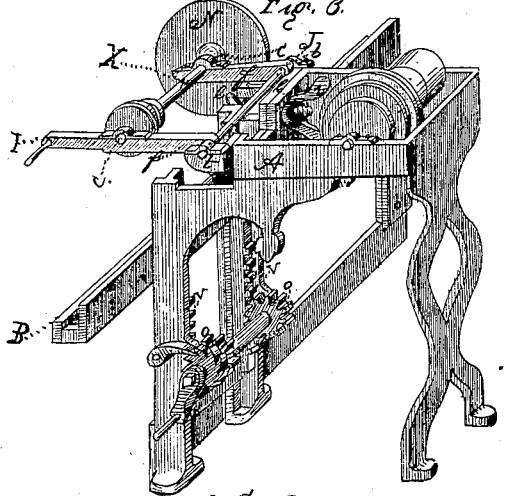
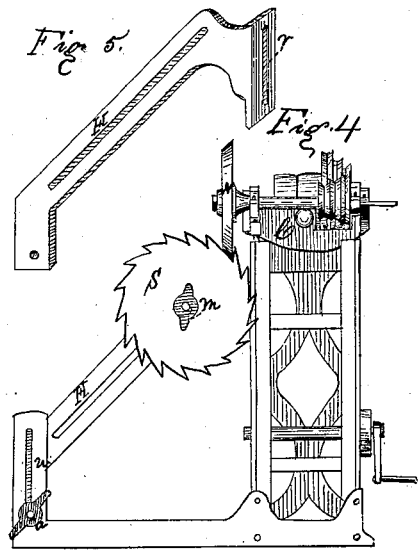
Witnesses
C. D. Brewer
J. C. Hill
Inventor
Harford J. Perkins

UNITED STATES PATENT OFFICE.

HARFORD J. PERKINS, OF WILLIAMSPORT, PENNSYLVANIA, ASSIGNOR TO GEORGE S. SNYDER, OF SAME PLACE.

IMPROVEMENT IN MACHINE FOR SHARPENING THE TEETH OF SAWS.

Specification forming part of Letters Patent No. 105,244, dated July 12, 1870; antedated July 1, 1870.

*To all whom it may concern:*

Be it known that I, HARFORD J. PERKINS, of the city of Williamsport, county of Lycoming, and State of Pennsylvania, have invented a new and useful Improvement for Sharpening the Teeth of Straight and Circular Saws; and I do hereby declare the following to be a full and correct description of the same, reference being had to the accompanying drawings, and to the letters and figures of reference marked thereon.

My invention consists in the construction of a machine for gumming and sharpening saws when in a vertical position by the use of an adjustable emery or other grinding wheel, in connection with the adjustable guide B and adjustable double-hinge clamp D, which is so adjusted and controlled as to give the saw-teeth any desired angle, and bevel either right or left, or to sharpen them square.

The construction of the machine will be better understood by the description contained in the accompanying drawings, in which—

Figure 1 represents a front view of the improved machine with a straight saw in position for sharpening. Fig. 2 is also a front view of a circular saw having bevel-edged teeth in position for sharpening. Fig. 3 is a perspective top and rear view of the machine. Fig. 4 is a front view of the machine with the slotted arm H attached thereto and circular saw in position thereon for sharpening. Fig. 5 is the slotted arm H, detached from the machine. Fig. 6 is an adjustable guide and rest for the clamp and straight saws to move in and rest upon when being sharpened. Fig. 7 is a clamp for holding a circular saw while being sharpened. Fig. 8 is a double-hinge clamp for holding and adjusting cross-cut circular saws with bevel-edged teeth when they are being sharpened.

Like letters in all the figures indicate the same parts.

A is an ordinary frame for supporting the several parts of the machine. B is an adjustable guide and rest, attached to the ratchet-bar P by the screw-bolt *u*, as shown in Fig. 1. The said guide B is elevated or let down by means of the pinions *o o* and ratchets *v v*, as shown in Fig. 3, thereby regulating the distance of the guide B from the grinding-wheel N, as shown in Fig. 1. The said guide B is also adjustable on the screw-bolt *u*, thereby enabling either end of said guide B to be elevated or depressed, for the purpose of adjusting saws having teeth of different angles to the grinding-wheel N. The guide B is constructed with rollers *e e e e e*, for the purpose of facilitating the lateral movement of the clamp G containing the saw, as shown in Fig. 1.

E is a rotary clamping-disk, for holding and supporting circular saws that are required to be sharpened square across the teeth, the said clamping-disk having a central screw-bolt, *d d*, firmly fastened therein, and passing through the clamping-plate *n*, which plate is confined upon the saw S by the nut *m* on the screw *d*, as shown in Figs. 4 and 7. The screw-bolt *d d* also projects back through the slotted arm H, where it is held by the nut on the screw-bolt *d*, as shown in Fig. 7. The said rotary clamping-disk E is movable along the slot in the arm H, for the purpose of suiting and adjusting saws of different sizes to the grinding-wheel N, as shown in Fig. 4.

The slotted arm H is adjustable in the slotted post *w*, and the slot *v* in the upper end of the arm H, and can be securely fastened at any desired point by means of the screw-bolt and nut *a*, as shown in Fig. 4. The purpose of this post *w* and device is to allow the slotted arm H to be elevated or depressed, so as to adjust the saw-teeth to the diminishing size of the emery or grinding-wheel N.

D is an adjustable double-acting hinge-clamp, for holding and adjusting cross-cut circular saws that require the teeth to be sharpened with beveled edges, the said hinge being constructed of two distinct parts and joined together by the screw-bolt *i*. The part *h* of the said hinge-clamp D is adjustable on the post *y*, as shown in Fig. 2, up and down, thereby allowing saws of various sizes to be brought in contact with the grinding-wheel N. The hinge is held securely to the post *y* at any desired point by means of the set-screw *q*. (Shown in Fig. 2.)

The notch *k* in part *h* is made in the shape of a half-circle, for the purpose of giving to the said hinge-clamp D an up-and-down rolling motion, by means of which the upper portion of the saw, when in position for sharpening, can be thrown backward toward or forward away from the grinding-wheel N, for the purpose of giving the edges of the saw-teeth any desired bevel.

The part $h\,h$ of the said hinge-clamp D turns partially on the screw-bolt $i$ both right and left, for the purpose of changing the saw $g$ thereon, thereby giving to the front edges of the saw-teeth the various bevels desired in saws used for cross-cutting. The saw $g$ is firmly held on the part $h\,h$ by the clamping-plate $n$ and thumb-screw $m$, as shown in Figs. 2 and 8.

G is an ordinary clamp for holding straight saws while being sharpened. The clamp, with the saw securely fastened therein, is moved laterally over the rollers $e\,e\,e\,e\,e$ in the guide B, for the purpose of bringing each one of the saw-teeth in the proper place in relation to the grinding-wheel to be sharpened.

The saw-teeth, when being sharpened, rest firmly against the finger $l$, (shown in Fig. 3,) having cross-slots and set-screws for its adjustment.

N is an adjustable emery or other grinding wheel, for gumming and sharpening the teeth of saws by grinding. It is removable from its shaft X by means of a screw-boss clamp, $a\,a$, (shown in Fig. 1,) in order to change the wheel for others that are required by the various kinds of saws, the edges of the wheels being made of any desired shape, so as to suit the notches or serrations that give shape to the saw-teeth. The shaft X, with the grinding-wheel thereon, is driven by a belt passing around cone-pulleys, by means of which the speed of the wheel N may be increased or diminished. The shaft X is hung on centers $c\,c$ in the arms $f\,f$, which project forward from the shaft J, which turns partially on its centers, so that the grinding-wheel N can be pressed down into and raised up out of the serrations or notches of the saw at will when the wheel N is in motion, there being a handle, I, for that purpose.

The shaft J, (shown in Fig. 3,) with the arms $f\,f$, rests in the jaws $t\,t$ of the plate C. (Shown in Figs. 1, 2, and 4.) The said plate C is connected to the front part of the frame A by means of the thumb-screw Z. (Shown in Fig. 3.) The screw Z passes through the center of the plate C, thus acting as a swivel, thereby making the plate C adjustable on the said thumb-screw Z, for the purpose of giving to the arms $f\,f$ and shaft X, with the grinding-wheel N thereon, a wrist movement, in order to adjust the edge and bevel of the said grinding-wheel N to any angle of the saw-teeth, thus enabling the square edge and the angled edge of the saw-teeth to be sharpened without adjusting the saw.

The plate C, with the arms $f\,f$, and shaft X, with the grinding-wheel N thereon, are held securely at any desired angle by screwing the thumb-screw Z hard upon the front part of the frame A.

What I claim as my invention is—

1. The adjustable guide B, having rollers $e\,e\,e\,e\,e$, connected with the ratchets V V, and operating in relation to the grinding-wheel N, substantially as described, and for the purposes specified.

2. The slotted post $w$ and arm H, when arranged and operating in relation to the grinding-wheel N, substantially as described.

3. The adjustable double-hinge clamp D, arranged and operating in relation to the grinding-wheel N, substantially as described, and for the purpose specified.

HARFORD J. PERKINS.

Witnesses:
C. D. BREWER,
J. C. HILL.